United States Patent
Hohmann et al.

(10) Patent No.: US 8,297,903 B2
(45) Date of Patent: Oct. 30, 2012

(54) SEGMENTED NUT FOR SCREW CONNECTIONS

(76) Inventors: Frank Hohmann, Warstein (DE); Jörg Hohmann, Meschede (DE)

(*) Notice: Subject to any disclaimer, the term of this patent is extended or adjusted under 35 U.S.C. 154(b) by 0 days.

(21) Appl. No.: 13/099,389

(22) Filed: May 3, 2011

(65) Prior Publication Data

US 2011/0268534 A1 Nov. 3, 2011

(51) Int. Cl.
*F16B 37/08* (2006.01)
(52) U.S. Cl. ........................................ 411/433
(58) Field of Classification Search .............. 411/433, 411/437, 540, 539
See application file for complete search history.

(56) References Cited

U.S. PATENT DOCUMENTS

| | | | |
|---|---|---|---|
| 1,001,042 A | 8/1911 | Kadel | |
| 3,147,662 A | 9/1964 | Snook | |
| 3,393,598 A * | 7/1968 | Bettinger | 411/433 |
| 4,531,872 A * | 7/1985 | Warkotsh | 411/433 |
| 4,768,909 A | 9/1988 | Warkotch | |
| 5,032,048 A * | 7/1991 | Walton et al. | 411/433 |
| 6,212,917 B1 * | 4/2001 | Rathbun | 68/212 |
| 6,799,930 B1 | 10/2004 | More et al. | |
| 6,974,291 B2 * | 12/2005 | Li | 411/437 |
| 2008/0279623 A1 * | 11/2008 | McGlasson et al. | 403/374.4 |
| 2008/0301926 A1 | 12/2008 | Bucknell | |
| 2009/0162166 A1 | 6/2009 | Hohmann et al. | |

FOREIGN PATENT DOCUMENTS

| | | |
|---|---|---|
| DE | 1 991 256 | 3/1968 |
| DE | 83 08 905 | 6/1983 |
| EP | 0 408 239 A1 | 1/1991 |
| WO | 03/025405 A1 | 3/2003 |
| WO | 2008/136903 A1 | 11/2008 |

* cited by examiner

*Primary Examiner* — Flemming Saether
(74) *Attorney, Agent, or Firm* — Gudrun E. Huckett

(57) ABSTRACT

A nut for screw connections has two substantially identically sized nut segments of a half-shell shape, wherein the nut segments each have an inner side provided with an inner thread segment defining together an inner thread. The nut segments are connected to each other so as to be moveable toward each other until the nut segments reach a closed position. The nut segments are maintained in the closed position by springs or a locking device. An actuating device is moveably arranged on at least one of the two nut segments for releasing the closed position, wherein the actuating device is adapted to manually actuated.

7 Claims, 2 Drawing Sheets

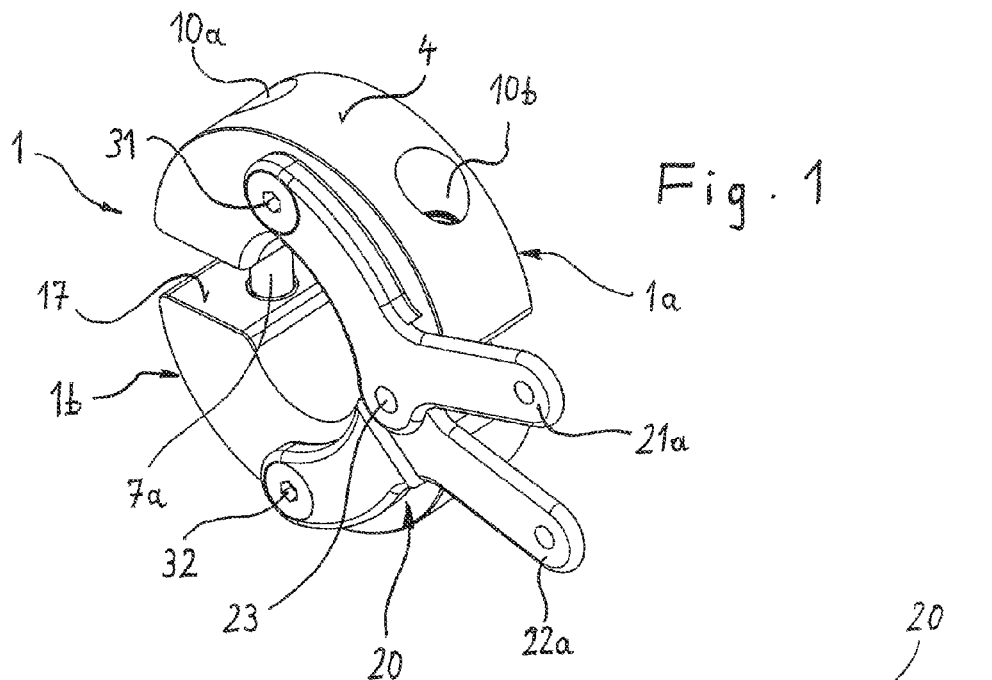
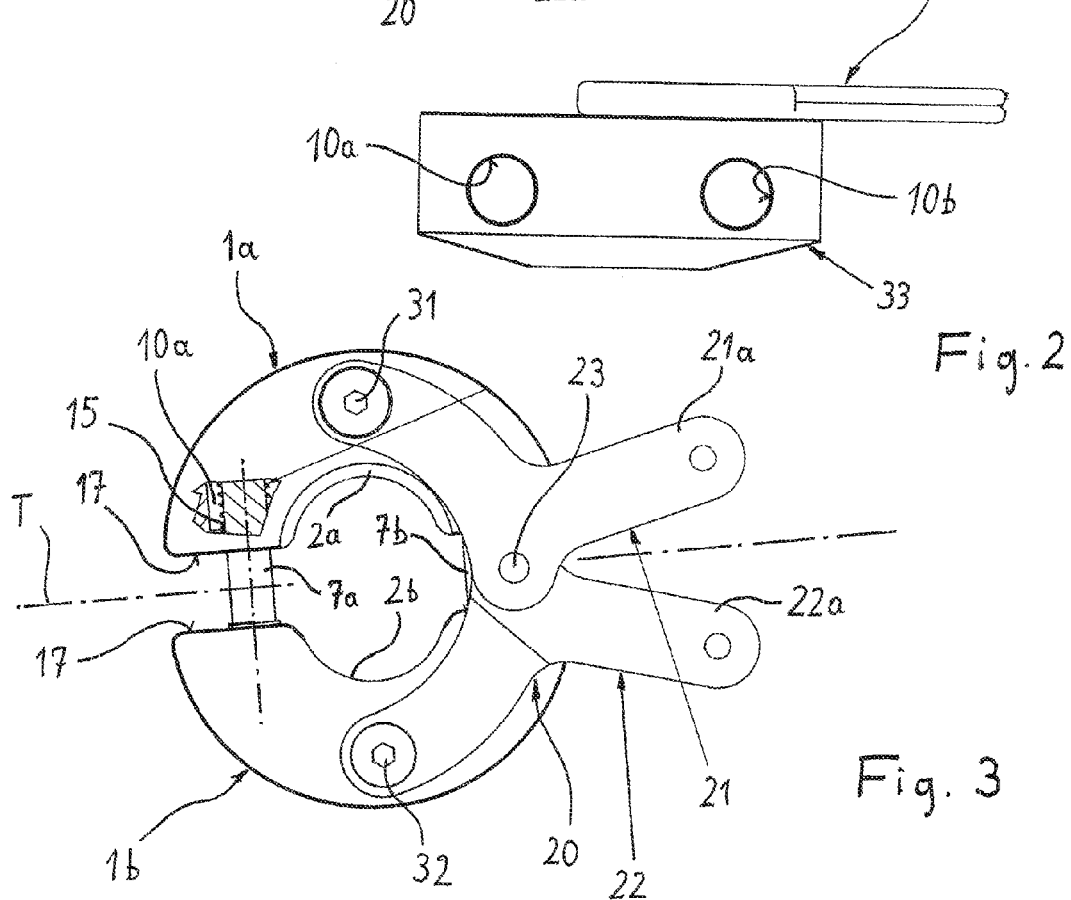

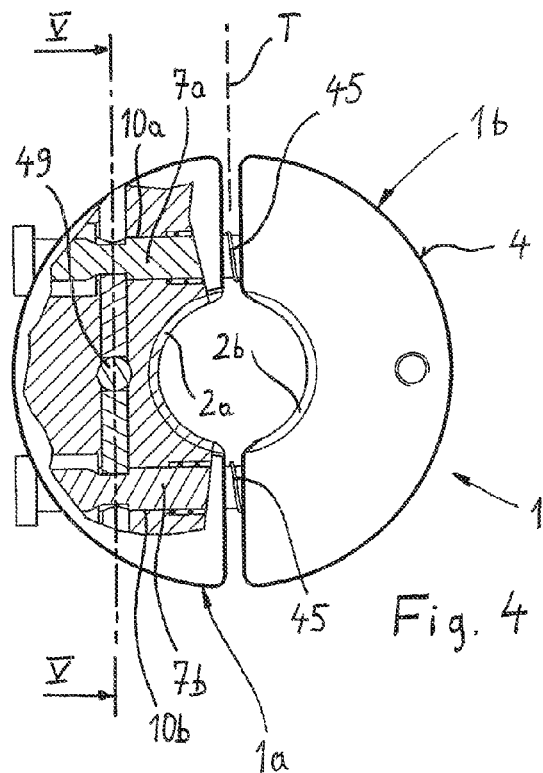
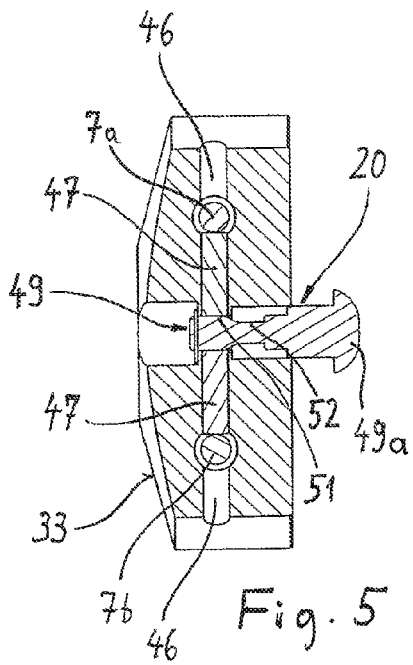
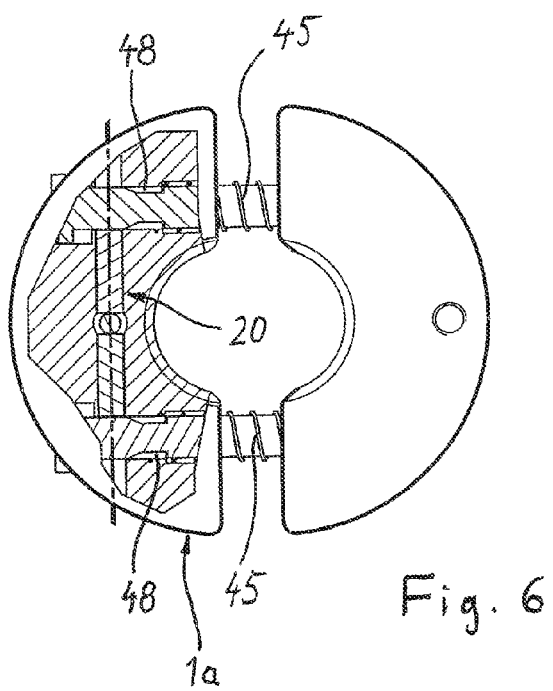
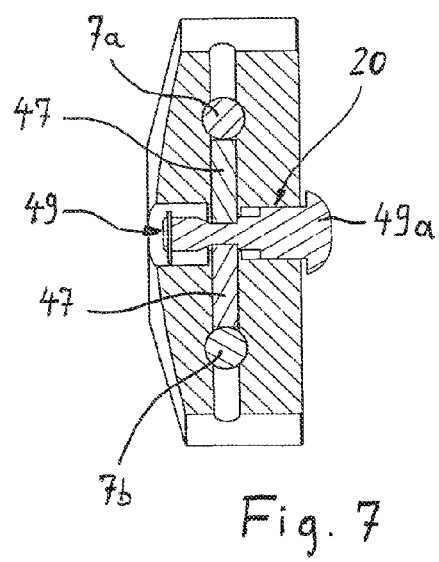

SEGMENTED NUT FOR SCREW CONNECTIONS

BACKGROUND OF THE INVENTION

The invention relates to a nut for screw connections. The nut is comprised of two substantially same-size half-shell screw segments that each on their inner side are provided with inner thread segments and are arranged so as to be movable relative to each other until a closed position is reached. Further, means are provided that maintain the nut segments in closed position.

Segmented nuts for use on screws or threaded bolts are known in the prior art. U.S. 2008/0301926 A1 discloses in FIGS. 9C-9F a segmented nut of a total of three identical nut segments. They are embodied like jaws and can be actuated by actuating a rotary ring that is rotatable about a central axis of the nut between an open position and a closed position wherein the jaws carry out a radial movement. In the closed position inner thread segments formed on the inner side of the screw segments engage the outer thread of matching size of a threaded bolt. In the open position, the inner thread sections formed on the segments do not engage the outer thread.

The segmented nut according to U.S. 2008/0301926 A1 is designed and constructed especially for use in a hydraulic tensioning jack. For many other applications in the field of plant and apparatus engineering this segmented nut is however not suitable, particularly because of the drive action by means of a rotary ring that is arranged coaxially to the nut. In practice, this is not suitable for many construction and engineering situations.

DE 1 991 256 discloses a nut for a screw connection with two substantially identically designed nut segments that are pivotable relative to each other and, for this purpose, are pivotably connected with each other at a first end area. For a positive fit (form fit) with the thread of a threaded rod, the nut, with the nut segments in open position, is first pushed onto the thread of the rod as far as possible and the nut segments are closed. Subsequently, the nut is screwed by several turns so that a cylindrically designed longitudinal section of the nut reaches a receptacle in the form of a blind bore; opening of the nut segments from this point on is not possible anymore. The receptacle in the form of a blind bore serves as a closure means that prevents opening of the segments. The disadvantage is that only by a screwing action of several turns a closure of the nut is achieved.

DE 83 08 905 U1 discloses a nut that is suitable for a quick adjustment in axial direction. It is comprised of a housing comprising a ring that can be deflected against a spring force. This ring is provided on one of its inner halves with a thread structure. A pressure spring loads the ring in radial direction so that a positive fit (form fit) of the thread structure with the outer thread of the threaded bolt results. For opening, i.e., releasing the thread engagement, a pivotable lever is provided that is supported in the housing so as to pivot about a pivot axis that is arranged at a right angle to the screw axis. The actuation of the lever leads to a radial, i.e., lateral, displacement of the ring and release of the thread engagement.

The invention has the object to provide a segmented nut that is suitable for many applications in plant and apparatus engineering and is changeable very quickly between the closed position and the open position.

SUMMARY OF THE INVENTION

In accordance with the present invention, this is achieved for a segmented nut of the aforementioned kind in that on at least one of the two segments an actuation device is movably arranged that is engageable by hand for releasing the closed position.

The two segments or jaws of the segmented nut are moved relative to each other in parallel alignment so that already after short travel from the closed position into the open position a separation of the inner thread segments from the matching outer thread can be achieved. In practice, such a segmented nut can be operated especially quickly and simply, i.e., by means of a single actuation action. An important practical application are, for example, flange screw connections on housings or foundations of wind power devices. The fastening flanges employed in these device are provided about the circumference with screw connections that are closely positioned relative to each other so that between the individual screw connections, but also inwardly toward the housing or foundation, there is only little space available. Only in outward direction, the screw connection is freely accessible and therefore provides here a certain accessibility in order to transfer the nut by means of the actuation device provided thereat from the closed position into the open position.

Advantageous embodiments of the nut according to the invention are disclosed in the dependent claims.

BRIEF DESCRIPTION OF THE DRAWING

Embodiments of the invention will be explained in the following with reference to the Figures.

FIG. 1 is a perspective illustration of a first embodiment of a nut comprised of two nut segments wherein the nut is illustrated in the open state.

FIG. 2 is a side view of the nut of FIG. 1.

FIG. 3 shows the nut in plan view wherein a detail in the interior of the nut segments is illustrated in a broken-away section.

FIG. 4 is an illustration, partially in section, of a second embodiment of a nut comprised of two nut segments wherein the nut is shown in the closed position.

FIG. 5 is a section view of the nut along the section plane V-V indicated in FIG. 4.

FIG. 6 is an illustration as in FIG. 4 but in the open position of the nut.

FIG. 7 is a section view as in FIG. 5 but in the open position of the nut.

DESCRIPTION OF THE PREFERRED EMBODIMENTS

The segmented nut illustrated in FIGS. 1 to 3, is comprised of two jaws or nut segments 1a, 1b that are movable in parallel away from each other and toward each other. Each nut segment 1a, 1b has approximately a 180 degree circumferential extension. Separation or opening of the segments 1a, 1b, as illustrated in FIGS. 1-3, effects opening of the inner thread segments 2a, 2b formed in the nut segments so that the nut opened in this way can be moved across a threaded bolt or a screw in axial direction to a desired longitudinal position on the thread without having to carry out a cumbersome screwing action across the entire length of the thread of the threaded bolt or screw. On very long threaded bolts the nut can therefore be positioned quickly at the desired longitudinal position and then, by closing the two jaws, can be secured with positive fit on the threaded bolt.

Basically, two different embodiments are possible. In the first embodiment the two inner thread segments 2a, 2b provide a complete standard inner thread when the nut is closed. Such a nut can therefore be screwed just like any other nut when in its closed position.

In a second embodiment, the two inner thread segments 2a, 2b in the closed position of the nut supplement each other to a clamping inner thread whose thread flanks clamp frictionally on matching threaded flanks of the threaded bolt or the screw. Such a nut cannot be rotated in its closed position or only by application of very high torque on the corresponding outer thread. The basic configuration of the nut is the same in both embodiments.

The two segments 1a, 1b have semi-circular outer surfaces 4 and abut each other in the closed position of the nut at a separation plane T (FIG. 3). When the nut is open, this separation plane T opens to a separation gap of e.g. 5 mm to 10 mm.

For obtaining a parallel guiding action of the two nut segments 1a, 1b, the nut segments 1a, 1b are seated so as move or glide on bolts 7a, 7b that extend at a right angle relative to the separation plane T. For this purpose, the bolt 7a is seated so as to be movable in longitudinal direction in bores 10a of the nut segments that are aligned with each other and the bolt 7b is seated so as to be movable in longitudinal direction in bores 10b of the nut segments that are aligned with each other. Coil springs 15 are supported against the ends of the bolts 7a, 7b and are supported, relative to the separation plane T, on an axial surface at the bottom of the respective bores 10a, 10b. The axial surface can be a shoulder of the two-step bore 10a, 10b in this embodiment. Each one of the two bolts 7a, 7b is provided in the area of its two ends with such a spring 15 surrounding the bolt. The results of this arrangement of the springs 15 is a permanent pretension of the nut segments 1a, 1b in the closing direction. In contrast to the open position illustrated in FIGS. 1-3, the segments 1a, 1b as a result of the action of the springs 15 are usually closed, i.e., they either abut each other in the separating plane T with their flat sides 17 or they have only a minimal spacing relative to each other.

The jaws 1a, 1b that are thus spring-loaded into the closed position can be moved away from each other by hand by means of the actuation device 20, i.e., against the spring force, until the inner thread segments 2a, 2b formed on the segments 1a, 1b no longer engage by positive fit the outer thread on which the nut is seated.

The actuation device 20 is designed in this embodiment as a spreading device and is comprised of two levers 21, 22 that are connected to each other by an articulation 23. The articulation 23, as can be seen in FIG. 3, is arranged in the separating plane T of the two nut segments. The levers 21, 22 connected by the articulation 23 form a pliers-like actuating element with two actuation grips 21a, 22a that are angled relative to each other and point outwardly as well as lever sections that are projecting past the articulation 23 and end pivotably in bearings 31, 32 in the nut segments. The rotary bearing 31 of the first lever 21 is positioned at the symmetry center of the segments 1a, the rotary bearing 32 of the second lever 22 is located at the symmetry center of the segment 1b.

When upon manual actuation by the operator the V-shaped actuating grips 21a, 22a are moved toward each other, this causes by means of the rotary bearings 23, 31, 32 a movement of the segments 1a, 1b away from each other and thus causes a release of the positive locking action relative to the threaded bolt. As soon as the actuating grips 21a, 22a of the actuating device are released, the nut segments 1a, 1b are closed again by the action of the springs 15 and engage with positive fit the threaded bolt so that the segmented nut is positionally secured on the threaded bolt.

FIG. 2 shows that the segmented nut for an improved centering action on the respective support is conically designed on its bottom side, i.e., on the side that is facing away from the actuating device 20. The bottom side is in the form of a flat truncated cone wherein the conical surface 33 is arranged with one half on one nut segment and with the other half on the other nut segment.

In the second embodiment according to FIGS. 4-7, the two segments 1a, 1b are also guided relative to each other by means of bolts 7a, 7b, wherein the bolt 7a is positioned on one side of the screw connection (i.e., the inner thread of the nut provided to form the screw connection) and the other bolt 7b on the other side of the screw connection so that the nut segments are moveable relative to each other in parallel toward and away from each other.

Each bolt 7a, 7b is surrounded at its central longitudinal section by a pressure spring 45 that is embodied as a coil spring. The ends of the pressure spring 45 are each supported on the axial surfaces of the first nut segment 1a and the second segment 1b. As a result of this, a permanent loading of the nut segments 1a, 1b in the opening direction is caused by the pretension of the pressure springs 45. This is a difference to the afore described first embodiment in which the springs load the two jaws in the closing direction.

In the embodiment according to FIGS. 4-7 the actuating device 20 is embodied as a locking device. The segments 1a, 1b are locked in their closed position with pretension of the springs 45. This locking action is releasable by a single push onto a push button 49a wherein under the force of the released springs the nut segments move away from each other, i.e., they open.

A component of the actuating device 20 is a transverse passage 46 which is provided in only one of the nut segments 1a and intersects at a right angle the bores 10a, 10b in which the bolts 7a, 7b that guide the segments 1a, 1b relative to each other are positioned.

The transverse passage 46 receives two locking pins 47 as a further component of the actuating device 20 that are slidably arranged in the passage 46 and are configured to lock or arrest the respective bolt 7a, 7b. For this purpose, each bolt 7a, 7b is provided on its outer surface with a recess 48 or a step that is engaged in the locked state by the respective locking pin 47 by positive fit. The recess 48 extends in a ramp shape, as illustrated in FIG. 6.

The two locking pins 47 with regard to their longitudinal movability in the transverse passage 46 are lockable by engagement of a common locking element 49 that is arranged centrally between the bolts and is movably arranged in the nut segment 1a in a direction transverse to the locking pins 47. The locking element 49 is also a component of the actuating device.

The locking element 49 is designed like a bolt and has across its length members 51, 52 of different cross-sectional size. A first member 51 of a larger cross-section size is adjoined by a second member 52 of a smaller sized cross-section. The smaller sized member 52 serves as a release section. Externally, i.e., outside of the nut segment 1a, the locking element 49 is extended to form a pushbutton 49a. The pushbutton 49a is located on the side of the nut segment 1a that is facing away from the cone 33.

The nut according to FIGS. 4-7 is closed about a threaded bolt in that the segments 1a, 1b are moved by hand toward each other until a locking action of the bolts 7a, 7b on the locking pins 47 occurs. In this locked position the locking pins 47, in turn, are secured in longitudinal direction by axial support on the member 51 of larger cross-section of the locking element 49.

For a quick release of the nut, by applying pressure with the thumb, for example, the pushbutton 49a of the locking element 49 is pushed toward the nut segment 1a so that the locking element 49 is displaced and the other member 52, serving as a release section, now releases the locking pins 47 supported on the member 51. They move toward each other and their respective opposite ends release the bolts 7a, 7b. The release movement of the locking pins 47 is assisted by the ramps provided at the recesses 48. Under the action of the springs 45 the nut opens, i.e., it springs open.

In both embodiments an anchoring means for a fastening element, such as an eyelet or ring member, can be provided on the semi-circular outer surface 4 of the segments 1a, 1b. In the vicinity of a hydraulic screw tension cylinder which is to be prevented from flying off when actuated, the nut is attached to the screw bolt arranged adjacent to it in the circumferential direction. A belt that is connected to the eyelet or ring serves as a securing belt. For sufficient positional securing action of this securing belt it is therefore not required to first screw on the nut by many turns onto the outer thread of the neighboring screw bolt. Instead, the nut is simply opened, in the open state is pushed in longitudinal direction onto the existing thread, and is then closed. In reverse order, for releasing the nut, only a single actuation action is required, i.e., in the first case spreading apart the segments 1a, 1b and in the second case applying pressure onto the push button resulting in the two nut segments 1a, 1b springing apart.

The specification incorporates by reference the entire disclosure of German priority document 10 2010 016 758.4 having a filing date of May 3, 2010.

While specific embodiments of the invention have been shown and described in detail to illustrate the inventive principles, it will be understood that the invention may be embodied otherwise without departing from such principles.

What is claimed is:

1. A nut for screw connections, the nut comprising:
    two substantially identically sized nut segments of a half-shell shape, wherein the nut segments each have an inner side provided with an inner thread segment defining together an inner thread;
    wherein the nut segments are connected to each other so as to be moveable toward each other until the nut segments reach a closed position;
    means for maintaining a closed position of the nut segments comprising two bolts supported parallel to each other in the nut segments for guiding the nut segments in parallel alignment, wherein, relative to the inner thread, the two bolts are positioned opposite each other relative to the axial plane, and further comprising a common locking element acting on the two bolts to lock the two bolts in the nut segments in the closed position, wherein the locking element is positioned between the two bolts in one of the two nut segments so as to be movable; and
    an actuating device moveably arranged on at least one of the two nut segments for releasing the closed position, wherein the actuating device is adapted to be manually actuated.

2. The nut according to claim 1, further comprising springs that load the nut segments in an opening direction toward an open position.

3. The nut according to claim 2, wherein, relative to the inner thread, a first one of the springs and a second one of the springs are positioned opposite each other.

4. The nut according to claim 2, wherein the springs are coil springs having a first end and a second end, wherein the nut segments have bores in which the coil springs are positioned, wherein the first end of the coil springs is supported on an axial surface provided on the nut segments, respectively.

5. The nut according to claim 4, wherein the coil springs are positioned on the bolts.

6. The nut according to claim 1, wherein the locking element is provided with a push button that is located outside of said one of the two nut segments.

7. The nut according to claim 6, wherein said one of the two nut segments comprises a transverse passage and locking pins slidably arranged in the transverse passage, wherein the locking pins each have a first end and the first ends face each other and engage the locking element, and wherein the locking pins each have a second end and the second ends face away from each other and engage one of the bolts, respectively.

* * * * *